United States Patent
Martens

(10) Patent No.: US 9,295,872 B2
(45) Date of Patent: Mar. 29, 2016

(54) GROUP EXERCISE PROGRAM UTILIZING FREE WEIGHT, MACHINE FITNESS ACCESSORY AND BODY MOVEMENT EXERCISE COMBINATION

(75) Inventor: Philip S. Martens, Minneapolis, MN (US)

(73) Assignee: Millennium Fitness LTD, Minneapolis, MN (US)

( * ) Notice: Subject to any disclaimer, the term of this patent is extended or adjusted under 35 U.S.C. 154(b) by 778 days.

(21) Appl. No.: 12/886,677

(22) Filed: Sep. 21, 2010

(65) Prior Publication Data

US 2011/0070569 A1     Mar. 24, 2011

Related U.S. Application Data

(60) Provisional application No. 61/277,263, filed on Sep. 21, 2009.

(51) Int. Cl.
*A63B 21/072* (2006.01)
*G09B 19/00* (2006.01)
*A63B 5/20* (2006.01)
(Continued)

(52) U.S. Cl.
CPC ............ *A63B 21/072* (2013.01); *G09B 19/003* (2013.01); *A63B 5/20* (2013.01); *A63B 21/0552* (2013.01); *A63B 21/0628* (2015.01); *A63B 21/4029* (2015.10); *A63B 71/0036* (2013.01); *A63B 2071/063* (2013.01); *A63B 2225/107* (2013.01)

(58) Field of Classification Search
CPC ...... G09B 19/00; G09B 19/003; A63B 21/00; A63B 21/072; A63B 21/078; A63B 21/06; A63B 21/0601; A63B 21/0605; A63B 21/08; A63B 21/062; A63B 21/0552; A63B 23/00; A63B 24/0075; A63B 5/20; A63B 71/0036; A63B 2225/10
USPC ............................................... 434/247; 482/8
See application file for complete search history.

(56) References Cited

U.S. PATENT DOCUMENTS

| 6,755,770 | B2 | 6/2004 | Martens | |
| 7,101,326 | B2 * | 9/2006 | Gerschefske | ...... A63B 21/1672 482/129 |

(Continued)

*Primary Examiner* — Gene Kim
*Assistant Examiner* — Alyssa Hylinski
(74) *Attorney, Agent, or Firm* — Schwegman Lundberg & Woessner, P.A.

(57) ABSTRACT

The present invention is a group workout program that allows instructors to lead and teach multiple exercisers machine, free weight and other forms of exercise simultaneously. Participants within a single exercise area can do the same free weight, machine and accompanying exercises simultaneously. They can also circuit train in small, medium and large circuits doing the same or different exercises concurrently or simultaneously under the direction of an instructor. More than one exerciser can exercise on each machine at the same time and machines can be combined to deliver more exercises. An exerciser can do multiple exercises on a single machine either changing the configuration between exercises and also by leaving the configuration the same and simply moving between varying exercises. The workout program allows an instructor to teach exercises and exercise combinations in way where they can have a slow, medium, fast and mixed pace. The workout program method can be conducted simultaneously for participants of different fitness levels and experience and can be delivered for specific body parts or entire body workout programs.

24 Claims, 13 Drawing Sheets

(51) Int. Cl.
*A63B 21/055* (2006.01)
*A63B 71/00* (2006.01)
*A63B 71/06* (2006.01)

(56) References Cited

U.S. PATENT DOCUMENTS

| | | | |
|---|---|---|---|
| 7,189,190 B2 * | 3/2007 | Lamar | A63B 21/00 482/51 |
| 7,387,595 B2 | 6/2008 | Towley, III et al. | |
| 7,815,552 B2 * | 10/2010 | Dibble | A63B 21/045 482/103 |
| 2002/0028733 A1 * | 3/2002 | Martens | A63B 21/072 482/99 |
| 2003/0199373 A1 * | 10/2003 | Savage | A63B 23/12 482/142 |
| 2003/0211920 A1 * | 11/2003 | Mandel | A63B 21/015 482/116 |
| 2004/0005959 A1 * | 1/2004 | Takizawa | A63B 23/0355 482/51 |
| 2005/0266972 A1 * | 12/2005 | Shifferaw | A63B 21/0615 482/142 |
| 2006/0035766 A1 * | 2/2006 | Towley, III | A63B 21/0605 482/97 |
| 2007/0010381 A1 * | 1/2007 | Black | A63B 21/4029 482/130 |
| 2008/0224412 A1 * | 9/2008 | Newman-Bluestein | A63B 21/28 273/453 |
| 2010/0125030 A1 * | 5/2010 | Shifferaw | A63B 21/4047 482/94 |

* cited by examiner 4.1

4.1(A)

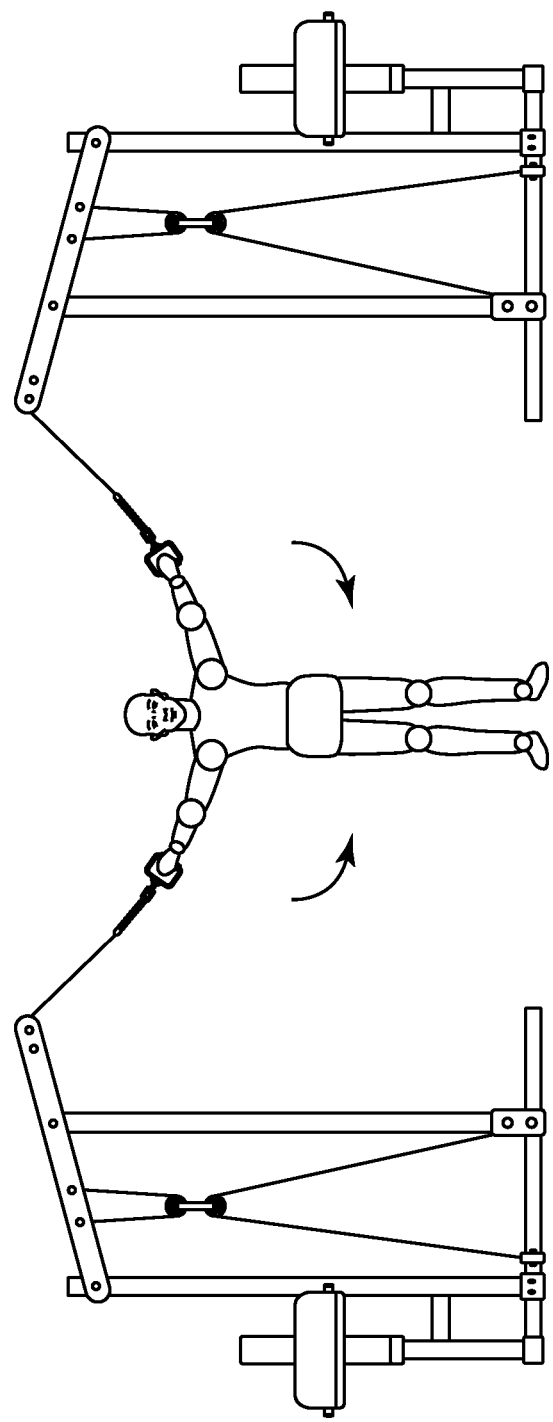
FIG. 4.2

GROUP EXERCISE PROGRAM UTILIZING FREE WEIGHT, MACHINE FITNESS ACCESSORY AND BODY MOVEMENT EXERCISE COMBINATION

CROSS-REFERENCE TO RELATED APPLICATION(S)

This application claims the benefit of provisional patent application Ser. No. 61/277,263 entitled GROUP EXERCISE PROGRAM UTILIZING FREE WEIGHT AND MACHINE EXERCISE COMBINATION, and filed on Sep. 21, 2009, the disclosure of which is incorporated by reference in its entirety.

BACKGROUND

This application relates to group exercise, specifically for strength training with free weights and machine exercise.

Group exercise programs started gaining popularity primarily back in the 1970's with the advent of Jane Fonda's Aerobics. Group exercise however dates back in various forms over the centuries as far back as ancient armies doing calisthenics and martial arts together. Today group training is conducted in swimming pools for the elderly and people recovering from surgery, schools for the young, private clubs, community centers, with sports teams, and in fitness centers for people of all ages across the country and world.

A sample of group exercise programs include aerobics, yoga, Pilates, kick-boxing, kettle bells, rubber bands, classes such as Spin® where an instructor leads a group of people through a stationary bicycle workout, and suspension training where people hang from suspended straps while they exercise. There are circuit training group classes where an instructor leads groups of individuals through exercise on different machines so each person is performing a different exercise at the same time. With Body Pump™ an instructor leads a group workout class doing various forms of free weight exercises where all participants perform the same exercise as the instructor at the same time utilizing dumbbell weights, barbells and other aerobic exercises. Other group programs utilize multiple identical resistance machines. With these an instructor leads a class where everyone is doing the same exercise simultaneously or a circuit (moving from machine to machine where each participant does a different exercise consecutively) on a resistance machine wherein the resistance is built into the machine (U.S. Pat. No. 7,189,190 (Lamar)).

Lamar discusses the advantages of their system in column 11 and lines 15-20 by stating "[t]he use of the bench unit 40 also adds additional convenience because there is no special accessory equipment required, and no need to change weights or require a supply of weights for changing." However, Lamar's method has no hand weights, machine accessories and other fitness accessories and is rather simplistic and limiting. Lamar only allows for exercises on the machine in various configurations utilizing the resistance engine. This eliminates countless other exercise options and combinations for both the participants and instructors. Having more exercises available helps people with special concerns or needs, adds exercise variety and efficacy, keeps a program more interesting and dynamic as well as increases the options for therapeutic exercise. Further, where the exercise program described in Lamar is as stated in column 2 and lines 50-55 such that "[t]he classes are preferably organized to seem effortless and straightforward to the participants." Any program that is effortless such as Lamar will produce limited results.

SUMMARY

The present invention is a group workout program that allows instructors to lead and teach multiple exercisers machine, free weight and other forms of exercise simultaneously. Participants within a single exercise area can do the same free weight, machine and accompanying exercises simultaneously. They can also circuit train in small, medium and large circuits doing the same or different exercises concurrently or simultaneously under the direction of an instructor. More than one exerciser can exercise on each machine at the same time and machines can be combined to deliver more exercises. An exerciser can do multiple exercises on a single machine either changing the configuration between exercises and also by leaving the configuration the same and simply moving between varying exercises. The workout program allows an instructor to teach exercises and exercise combinations in way where they can have a slow, medium, fast and mixed pace. The workout program method can be conducted simultaneously for participants of different fitness levels and experience and can be delivered for specific body parts or entire body workout programs.

DETAILED DESCRIPTION

1. The Group Workout Program

Figure 1:
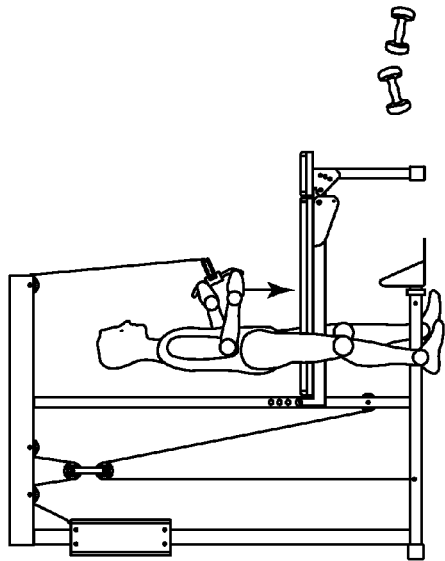
FIG. 1—Person doing sequence of free weight and machine exercises needing no conversion of the machine.
Figure 1:
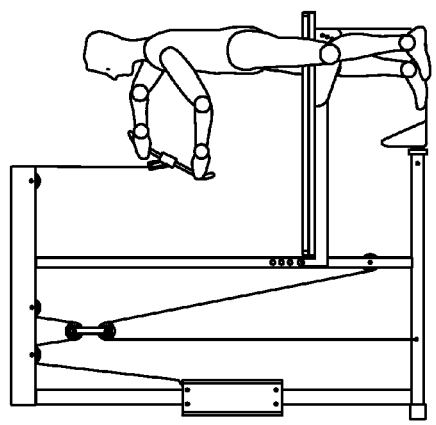
Figure 1:
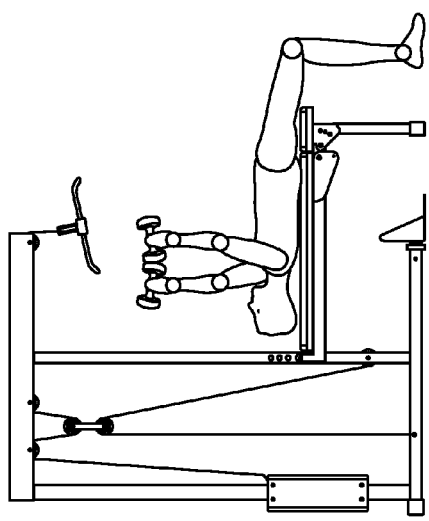

The program involves at least one or more group exercise areas in a facility. Each exercise area will have more than one G-Werx® Machine as described in U.S. Pat. No. 6,755,770 to Martens, the disclosure of which is incorporated herein by reference, a lever mounted machine with selectorized dumbbells such as those disclosed in U.S. Pat. No. 7,387,595 to Towley, the disclosure of which is incorporated herein by reference, or other machine available currently or in the future that uses a combination of dumbbell weights and machine together. For one embodiment of this program the machine allows for the resistance on the machine to be created by the gravitational weight of the dumbbells wherein the dumbbells can be removed from the machine and used separately for exercise. Another embodiment allows for a weight stack machine that can be used in combination with dumbbells.

Each group exercise area has at least one dumbbell rack or means to reasonably hold or arrange the dumbbells, at least a pair of selectorized dumbbells or array of accompanying standard dumbbells adequate for resistance on the machines as well as for use as free weights by the participants in the exercise program. Further each exercise area should have a variety of exercise handles that can be attached and removed from the machines allowing for additional exercises to be performed, and a number of exercise mats for exercises that require the user to sit or kneel at the machine if the machine facilitates kneeling exercises. The mats can also be used for non-machine exercises during a workout program. Also recommended are other exercise accessories such as exercise balls, elastic or rubber tubing used for exercise, jump ropes, weighted medicine balls, step boxes for use with the machine and separately, and others. The machine can also be used to facilitate exercises on the machine that do not involve free weight dumbbells or cable and pulley exercises.

Each G-Werx machine has a frame, dumbbell carrier mounted on the rear portion of the frame that is able to articulate up and down to provide exercise resistance. Each also has a bench which can be in the down position, folded up position and can removed from the frame depending upon the exercise or combination of exercises to be performed and desired use of space within a classroom or group workout area. When using the selectorized dumbbell machine, the bench or seat stays in a fixed position.

The first embodiment described uses a plurality of G-Werx machines. At least one or more of the machines should have available a detachable G-Werx leg extension accessory exercising mechanism. The machines are placed in a sensible arrangement allowing room for the participants to exercise on their machine and off the machine. The arrangement must also allow access to the weights, access to handles, access to mats and any other accessory or accessories used, and arranged in such a way that allows an instructor of the program room to move about while implementing, directing and observing the exercise program.

Each individual machine may accommodate one or more persons per machine. If there is more than one person per machine it can be implemented such that one rests while the other exercises, and/or one exercises on an accessory such as a fitness ball or simply doing an exercise on the floor such as crunches while another uses the machine. And/or one person can use the machine while another uses free weights amongst other possibilities and participants can switch back and forth between the exercise on and off the machine. Also each person can do an independent exercise on the machine at the same time or do so in combination with other exercises either on or off a machine. Thus as stated, two or more people can perform a combination of exercises in the group workout format per machine if desired.

Benches on the G-Werx machines can be down (with the bench back or pad either flat or at an incline position) and all participants can be doing free weight exercises such as bench presses, curls or many others. Benches can be down and participants can all be doing leg extensions with the leg attachment, pull down exercises or a multitude of other machine exercises. All this can be done in either singularly, and in any combination of free weight exercises, non free weight accessory exercises, and machine exercise. The method allows the user a leg attachment mountable to the machine as well as removable dumbbell resistance allowing a user further exercise options.

The G-Werx machines may also be placed directly across from one another such that they can be used in combination with one another to create a single exercise machine. Combining machines adds exercise variety by providing exercises to the group participant usually limited to singular exercisers on expensive oversized machines in health clubs. Lamar shows no means to combine exercise machines to provide additional exercises and is therefore inferior to the method at hand.

The exercise area for conducting the group workout method can be located close to a door leading outside, or can be located near a stairwell. It can be near any sort of walkway or walk path, hill, stairs, sidewalk or in a mall where people walk from store to store. In such case an instructor can utilize a combination of exercises such as for the legs and then have the participant run the stairs or go outside and walk, jog, run for any specified distance as part of the circuit training and return back to the group workout area and continue exercising as part of the overall workout program. The classroom can also be located near an area that has other typical health club workout machines and those machines can be incorporated into circuit programs involving the G-Werx machines, weights and any other exercise combination implemented by the instructor.

Although more limited in the overall number of exercises that can be performed on the machine, this workout method can utilize the selectorized dumbbell machine, if it is the preference of the instructor or participants. The participants can do a range and combination of selectorized dumbbell exercises, machine exercises, accessory exercises, stair climbing or walking, step up exercises and standard health club machine exercises outside the classroom area. Again such exercise area arrangement of said machines should allow enough room for participants to utilize the machine without interfering with one another during performance of the exercises. Placement of the machines across from one another can also allow them to be used in concert to perform a single exercise.

In this workout program method there can be one or more machines and weight racks per participant, each rack having a variety of dumbbell weights to choose from per machine thus allowing one or more participants to exercise per each machine in the classroom. With one participant per machine each participant can do the same machine exercise or free weight exercise on or off the machine simultaneously depending upon the direction of the instructor. Each participant can also perform a different exercise simultaneously when each machine is set up for a different exercise thus forming a circuit for circuit training. In the case of a circuit, the instructor can direct each participant to move on to the next machine to do a different exercise when they have completed theirs. Exercises not relating to the machines or free weights can be incorporated into the program or circuit as well. Individuals, pairs, triads, combinations of pairs or more people can switch back and forth or rotate between multiple exercises in a circuit-training format. Also extra racks can be located in the classroom to hold larger dumbbells that might be used less often because the limited number of people capable of lifting such heavy weights.

The fact that the invention utilizes hand dumbbells and additional accessories such as handles and exercise balls gives an advantage to the user in that it provides far more exercise possibilities and variations, and in the long run can help people attain a higher level of fitness and rehabilitation. For example most physical therapy facilities, sports facilities and workout areas utilize a combination of bands, machines, dumbbells, a range of handles and other accessories. The method at hand more closely resembles these settings but improves it by making it possible for participants to conduct all of these activities in a group while under the supervision of a fitness instructor, certified personal trainer or exercise rehabilitation specialist. Additionally, the invention allows an instructor to work with one group of people in a classroom who have been doing the exercises and program for a long period of time so they are more familiar with various exercises being performed in the class. Instruction to experienced participants could also be provided by other means such as video, DVD, streaming Internet or audio transmission.

The program method of lifting weights, doing machine and other exercises on accessories is designed to be organized and straightforward but challenging. Additionally, the program method of lifting free weights in combination with machine exercises allows anyone (both experienced and inexperienced) to have their workout enhanced by personal instruction.

In particular, the invention allows for flexibility to train novices and experienced groups and individuals simultaneously. Additionally, it allows for one-on-one training of individuals, especially novices with technique, breathing and to adjust the machine to proper levels of resistance. It also allows the trainer to focus on training novices without interrupting more experienced individuals' simultaneous workouts.

The instructor may also join in a class and participate by exercising with the participants while conducting the workout program.

2. Certification Program

The workout method can also implement a certification program for instructors to ensure they have full and accurate knowledge of the method and exercises used in the method, and to ensure the quality of their instruction. The certification of instructors can include hands on instruction utilizing any method available. Certification can also involve taking written tests, computer tests, practical or demonstrative tests, and any other means to verify that an instructor knows how to properly implement and teach the program and exercises. Also certification of instructors could be done remotely via Internet or other means allowing for potential instructors to learn the method and observe classes being taught. The program method can also be taught and certified through an independent study program including a workout manual or manuals, instructional DVD's, materials available for download online, and any other means to transmit knowledge of the workout program structure, exercise combinations and methods of teaching and operating a class to a potential instructor or instructors. The educational materials can be utilized by instructors as an ongoing basis to help them implement exercises and exercise techniques properly.

The method can have pre-planned workouts available to instructors which contain warm up exercises, strength exercises, circuit exercises, guidelines for weight resistance, instructions on how to and when to change handles and manipulate machines for maximum efficiency of conducting the workout program, stretches and cool down exercises. The pre-planned workouts can be delivered for specific body parts, for full body programs and can be such that conducting the specified workout can have variances in length of time from shorter to longer depending upon the length and frequency desired by participants. Workouts can be pre-planned and prepared in blocks of multiple weeks or months worth of programs or for individual workouts.

The workout program method can be licensed to individual trainers for a fee including monthly fees, annual fees, one-time fees, use fees, fees based on the number of machines used, percentage of revenue fees and any other type of fee and combination of the described fees. The program could also be franchised. The program method can be set up inside existing fitness facilities, set up in facilities designed and operated with the single purpose of teaching the group exercise classes, set up in facilities that are not generally used for fitness but want to offer said method, and in any way and any feasible location an instructor may choose to implement the workout program method.

This group workout program method utilizing G-Werx or other machines with removable dumbbell resistance or weight stack machine resistance can be taught to independent trainers not currently working at a fitness facility. Thus trained and certified instructors can open their own facility and offer this workout program method to a broader audience, helping more people to get fit and be healthy. This workout method can be led by one or more instructors for groups or individuals and require a fee for in person or remote instruction.

This method can also dramatically reduce the cost for participants working with a certified fitness or rehabilitation professional. The hourly cost paid for exercise instruction is shared by the participants within the class program and any rate can be charged by instructors or facilities implementing the program method.

FIG. 1 shows a person doing a sequence of free weight and machine exercises needing no conversion of machine. In particular, FIG. 1(A) shows a person doing a chest press free weight dumbbell exercise on a G-Werx machine where the bench is in the down position and the bench back is flat. FIG. 1(B) shows the same person after finishing the exercise in 1(A) doing a standing triceps push down exercise with the bench down and flat and dumbbells on the floor. FIG. 1(C) shows the same person after finishing the exercise in 1(B). The person is doing an exercise called a concentric push while using the same handle and leaving the machine in the identical configuration for three consecutive exercises. Although not shown weights can be on the carrier for resistance during the machine exercises.

As can be seen the machine is in the same position from one exercise to the next. The exerciser can easily transition from one exercise position to the other. At first they can simply do the chest presses and then set the weights to the floor. Then they will stand up and do the next exercise with their back to the machine. After that exercise is completed they will turn and do the next. Other machine and free weight exercises can be added to this series without changing the machine configuration. The person can move quickly from one to another with or without rest between thus performing a circuit on one independent machine.

The exercises can be such that they work the same muscle group, different muscle groups and combinations of groups, depending upon what the instructor intends for the participants. Then this series of exercises can be repeated several times through to further exercise and completely utilize the muscle groups. The exercises can be combined like these where the machine exercises essentially require the same weight resistance and in other cases the participant or instructor may want to alter the resistance between exercises while leaving the machine in the same configuration and utilizing the same handle.

This drawing represents one person exercising on one machine. This group method allows others in the same exercise area to perform the same series of exercise simultaneously, each on their own machine. An instructor is able to observe multiple people at one time to assess their technique, to assess if they are using proper resistance, to encourage them to exert themselves fully and to assist them with any problem or question they might have.

There are numerous series of exercises that can be done on the machine while keeping the same configuration, in particular when combining a free weight exercise with a machine exercise. By allowing instructors and users to transition between exercises with no conversion needed this method improves the efficiency of a workout program and requires less time for conversion yielding more time for exercising and efficiently utilizing time.

Figure 2:
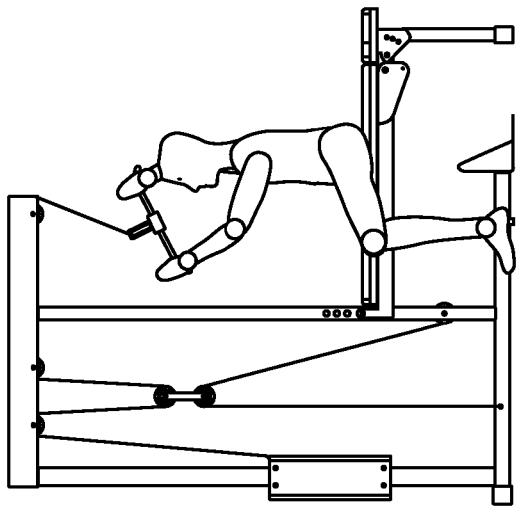
FIG. 2—Person doing consecutive exercises requiring conversion of machine.
Figure 2:
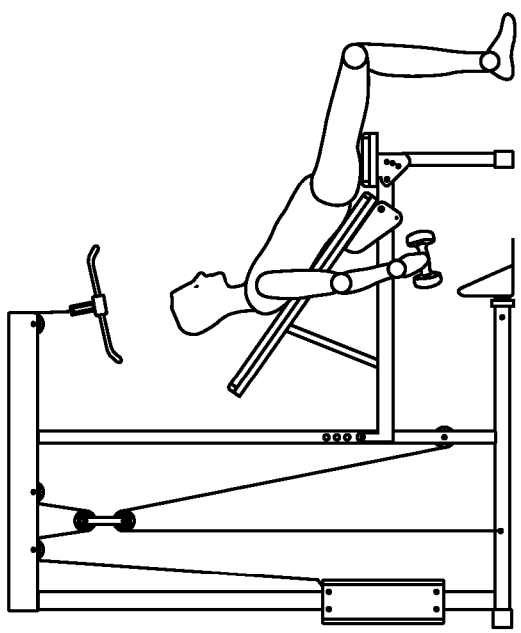

FIG. 2 shows a person doing an exercise combination requiring minimal conversion of the machine. FIG. 2(A) shows a person doing a reclined curl exercise for the biceps with free weight dumbbells. FIG. 2(B) shows the same person doing a seated lat pull down exercise on the same machine immediately after that person has finished with the first exercise in 2(A). In order to go from the first exercise to the next, the person exercising or the instructor (not shown) must lower the incline on the bench to a flat position so they can sit close to the machine and pull down. Thus the person exercising or the instructor will convert the machine between the exercises so the exerciser can go from one exercise to the next.

The exerciser can go back and forth between these exercises on the machine with a simple conversion. The weight resistance on the machine will not be impacted by the first exercise because the first exercise is a complete and separate free weight exercise that utilizes the machine but does not require the cable and pulley system until the second exercise. The unrelated exercises will require different resistance for the exerciser and switching back and forth between them will require continual switching of resistance and potentially changing the configuration of the machine as well. Dumbbells (not shown) can be added to the weight carrier for extra resistance during the machine exercise.

With this method an instructor may choose to have the participants do this series of exercises multiple times or any other series similar or different that requires minimal conversion. When the participant does the combination of exercises again, if the instructor (not shown) chooses, then the exerciser and/or instructor can add or subtract weight resistance from the free weights being used by switching the weights. They can also add or subtract weight resistance from the machine, or alter both machine and free weight resistance based upon how challenging the exercise was the first time for the exerciser and/or based upon the desired result of the resistance or repletion range used during the exercise. Thus the instructor and exerciser can easily find the proper resistance for each participant in the group workout with every exercise. In the group format of this method there can be several people doing this same series of exercises or other combinations that involve converting the machine apparatus. The instructor can gauge their exertion levels during the performance of the exercise and help all participants find the proper level of resistance based upon the desired outcome of the exercise and other factors such as the temperament, age, fitness and desire for what level they wish to push themselves during the exercise program.

This figure shows one person and in an exercise area. There can and will be other machines and other participants doing this exercise combination or other combinations depending upon how an instructor chooses to initiate the workout program at any given time.

Figure 3:
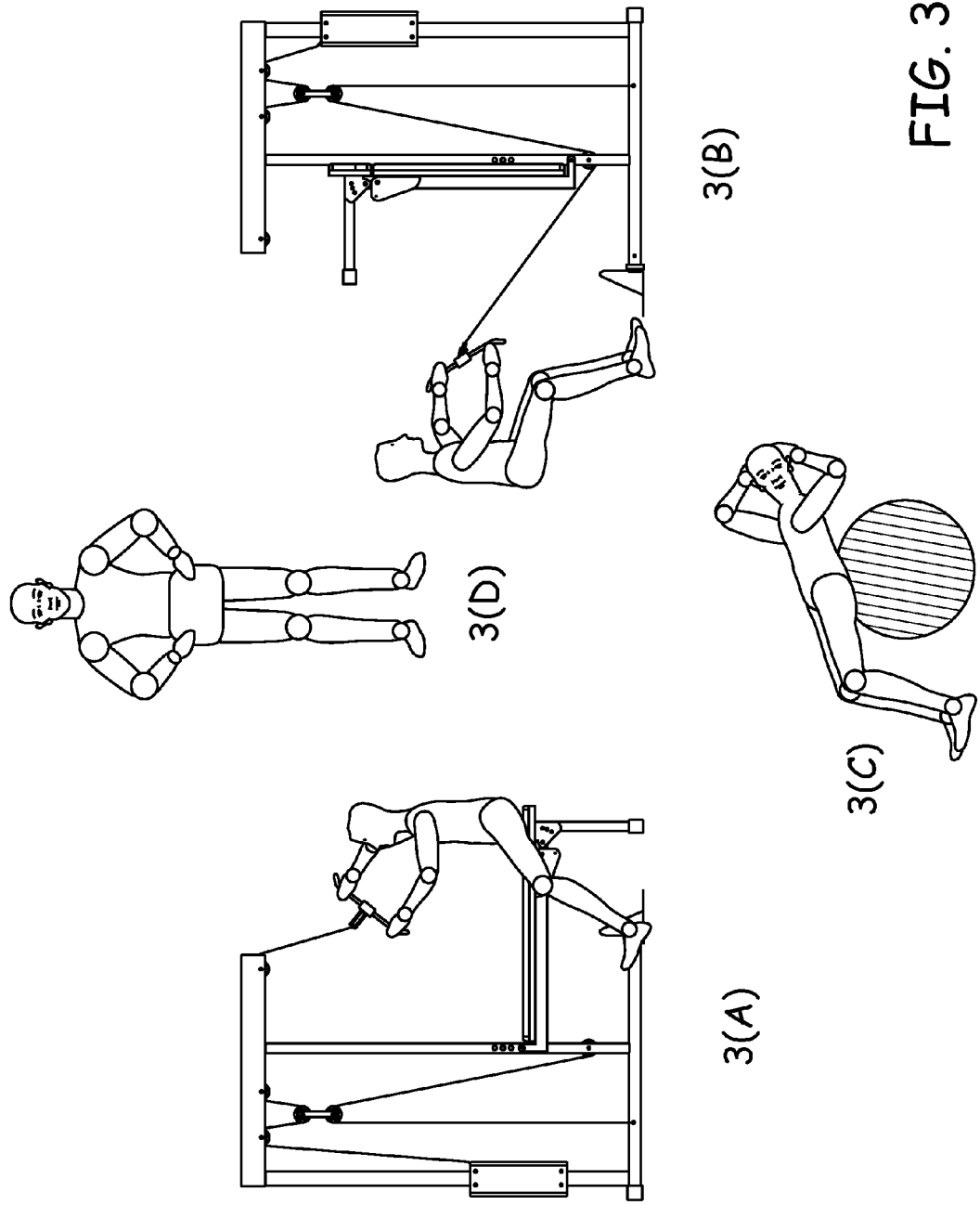
FIG. 3—Two people on two machines and one person doing a ball crunch with an instructor observing, then people switch between exercises.

FIG. 3 illustrates three exercisers doing three different exercises on two machines and an exercise ball with instructor observing. FIG. 3 shows three different people doing three different exercises on two G-Werx machines and one ball accessory. Then the exercisers can transition by rotating between these three exercises. This is known as a mini-circuit or round robin style workout exercise series. It can be done with many exercises with this method, whereas here the exercise in FIG. 3(A) is an upright-seated pull with the bench in the down position and bench back in the flat position. FIG. 3(B) is a person doing a squat exercise with the bench folded in the upright position and 3(C) is a person doing an abdominal crunch on an exercise ball. The individuals participating in the group complete a three exercise series at one time moving from one to another after each finishes. The instructor 3(D) is observing as the participants carry out their exercises. An instructor could also have them repeat several sets of exercise series before moving on to the next series or individual exercises. The instructor can have participants move between exercises based upon the number of repetitions they perform and can also move people through exercise series by timing the duration of the exercise and have each participant move dependent upon a period of time, for example 30 seconds.

Any series of exercises can be combined and multiple exercisers can be doing this same series of exercises simultaneously on other machines and accessories in the same exercise area. An instructor can have various reasons why he or she would use certain exercise combinations together such as for a particular sport, for working a particular muscle group, for a means to simply keep the workout new and interesting, because a participant has requested a particular exercise and others. As shown here the instructor is observing three people but at the same time can be observing other exercisers doing this same combination, other combinations and/or exercises the instructor has chosen for the other participant(s) to do. There are many possible combinations and also an instructor can add more exercises to the combination with 4, 5, 6 or more exercises in one circuit. The number of exercises and exercise combinations performed by participants has few limits. The capacity of the participants to do multiple exercises consecutively may raise their breathing and heart rate substantially so an instructor can add a resting period or station between exercises if he or she chooses. The instructor can turn the exercise area into one large circuit or can divide the participants into multiple circuits of groups within the larger group of exercisers doing circuits.

Further in 3(B) we see an exerciser utilizing the machine while the bench is folded up. The method is such that the bench can be stood up to save space for when it is put away, rolled into a corner or otherwise not in use, it is not able to be used by participants in such position with bench folded up. The present method adds more use to the machine while simultaneously creating more room for users and instructors to allow exercises in the extra space created by folding the bench up. Further, the method allows that the bench can fold up for storage and have rollers or other means on the machines to move them from one space to another.

Figure 4:
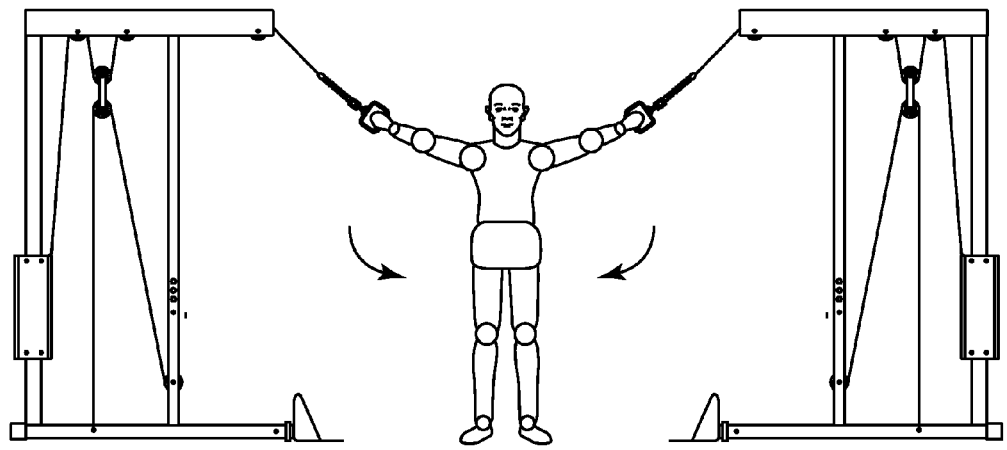
FIG. 4—Two machines combined to make one exercise.
Figure 4:
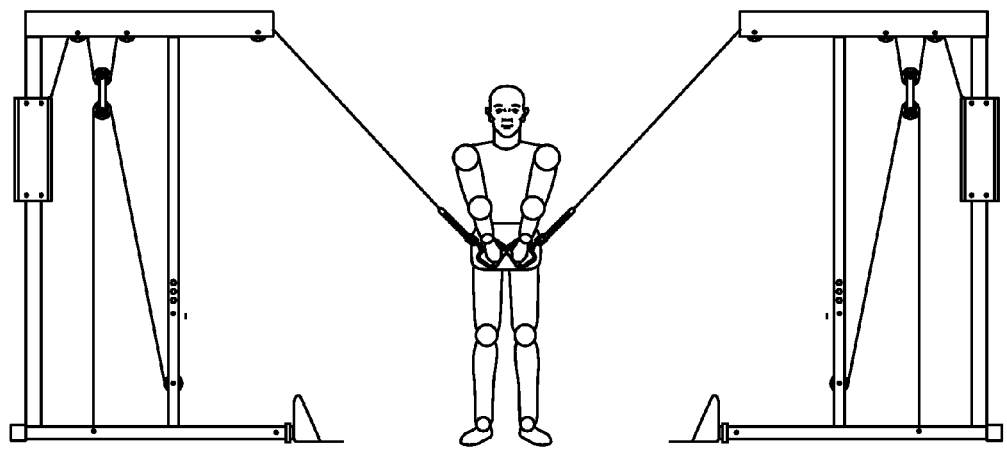

FIG. 4 shows two machines combined to make one exercise. FIG. 4.1 shows two G-Werx machines with benches removed opposite one another and an individual standing between the two machines. Each machine has a handle at the end of the machine's cable held by the exerciser. The cable length can also be extended by attaching an accessory chain to the cable for this exercise. In such case the handle is attached to the other end of the chain with a clip or other mechanism. FIG. 4.1(A) shows a close up of the exerciser after they have pulled their hands together. The two individual machines working together become one machine allowing this user to do this exercise commonly known as a cable fly or cable cross-over exercise. There are other exercise combinations that could be made by combining machines and combining the machines adds to the diversity and range of exercise possibilities for the instructor (not shown) to implement and for the participants to perform. This exercise in the group format could be done one person at a time while others observe and cheer on and inspire the exerciser performing. This way the participants can all get individual attention during the exercise. It can also be done such that more than one machine is set up this way and this can be done by several people at a time. It can also be used as a single exercise inside a circuit. Further if an exercise such as this requires more coaching because it is difficult to perform, the instructor could stand at this part of the exercise area while a circuit is performed. Then the instructor will be best able to help participants perform this one while others that may be less difficult can be performed without as much observation by the instructor. A similar exercise can be created using the lower cable and pulleys.

FIG. 4.2 shows two selectorized dumbbell machines opposite one another and an individual standing between the two machines. The exerciser performs the same exercise as in FIG. 4.1. However with these machines the range of motion is more limited and the exerciser may not be able to pull their hands all the way together to fully complete the exercise making the G-Werx machine more effective.

Figure 5:
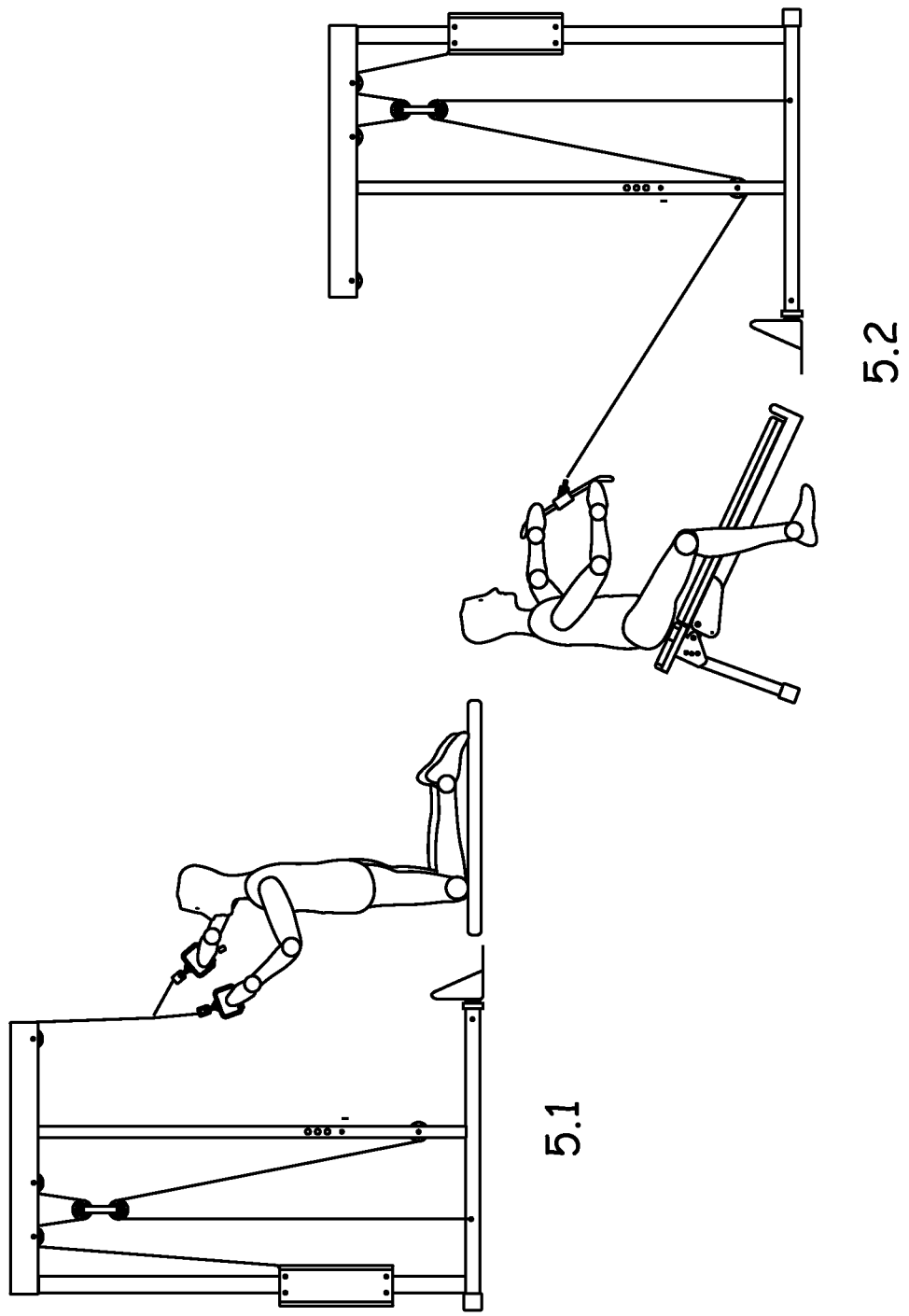
FIG. 5—Persons doing exercises requiring the bench to be removed and person using removed bench to modify an exercise.

FIG. 5 shows persons doing exercises requiring the bench to be removed. FIG. 5.1 shows a participant doing an exercise on a G-Werx machine while kneeling on a mat or pad. This is a kneeling abdominal crunch and requires removal of the bench from the machine for this exercise to be performed. In order to assist the exerciser(s) in proper technique an instructor may choose to comment orally by telling exerciser what they are doing right, what they are doing wrong, by asking if the resistance level is adequate, too much or too little, and by encouraging the exerciser to do more repetitions who has come for the extra help and encouragement. An instructor (not shown) may choose to ask participant to stop while the instructor demonstrates proper technique to them individually or to other class participants (not shown) at the same time. An instructor may choose to put their hands on the client in an appropriate manner to help guide the exerciser through the proper form of the exercise as they learn to perform it correctly.

FIG. 5.2 shows the bench used as a seat to elevate the exerciser and change the angle of the pull while doing a seated row style exercise. Here the bench is removed allowing more exercises and thus provides a significant advantage to both an instructor directing a class and the user participating within. Further sitting higher up on the bench is beneficial to people of a large stature who may have difficulties getting up and down from the floor to perform a similar exercise seated on the floor.

Most machines have fixed plates or other forms of resistance built in to the machine that cannot be changed while in use. With this method an instructor (not shown) is able to add or subtract dumbbell weight to the carrier of a G-Werx machine by adding or removing a dumbbell from a dumbbell receptacle while the participant has pulled the handle down or is using the machine. This technology can reduce the time needed to change the resistance when an instructor or participant feels they need the resistance increased or decreased as the participant does not need to completely stop the exercise.

Figure 6:
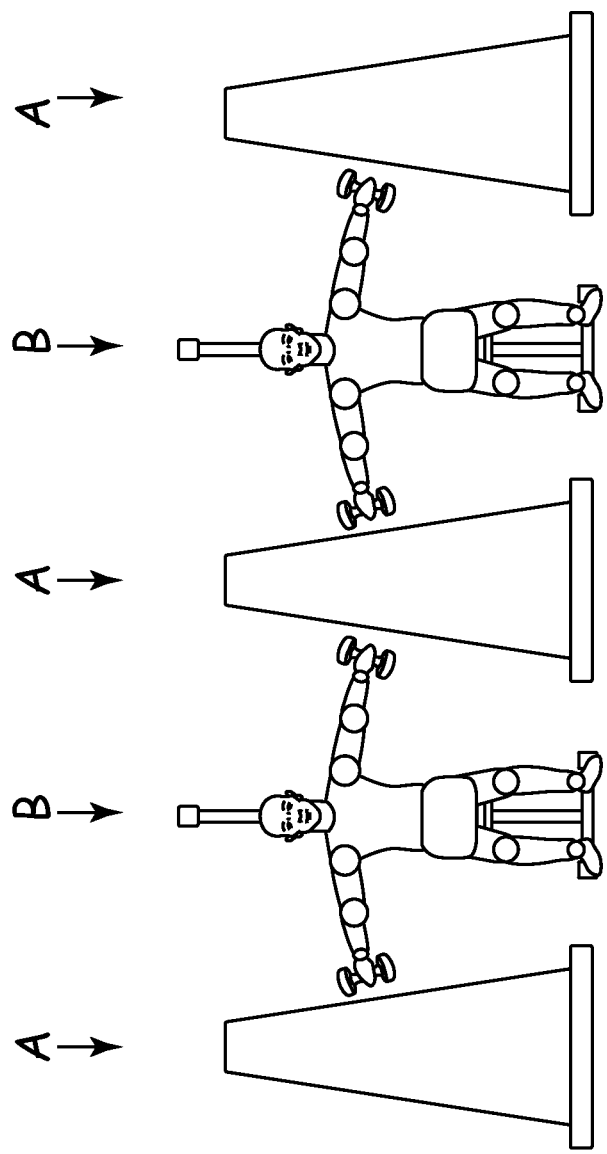
FIG. 6—Exercisers on machines with accompanying weight racks and appropriate space in between for exercises to be performed.

FIG. 6 shows exercisers on machines with weight racks and appropriate space in between for exercises to be completed. In particular, FIG. 6 shows three dumbbell racks loaded with dumbbell weights (not shown) (A), a front view of two G-Werx machines (B) and two seated exercisers with arms fully extended lifting dumbbell weights to the side. This figure demonstrates a means to arrange machines and racks close together while leaving adequate space for exercisers to complete exercises which would have them extend their arms fully to the side. The exercisers could also be lying flat or inclined on the bench doing a similar type of movement extending arms to the side and the distance between the machines will allow them to complete such exercise without interference from one another.

Figure 7:
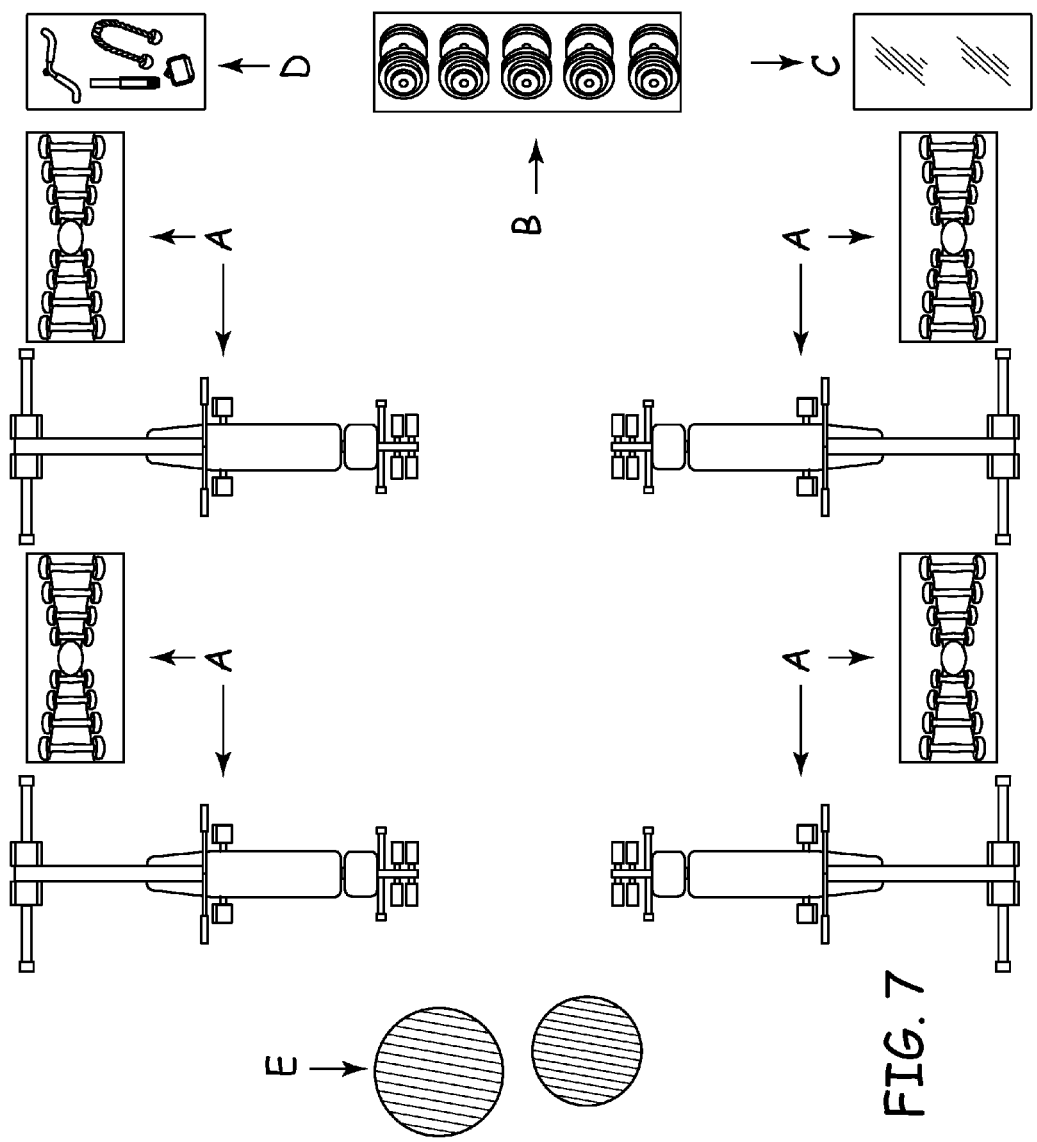
FIG. 7—Top view of four machines arranged opposite one another with weight racks and accessories.

FIG. 7 shows a top view of a group exercise area with a configuration of four machines placed opposite one another with racks and accessories. FIG. 7 shows a top view of four G-Werx machines and accompanying dumbbell racks (A) or holders next to each machine. (B) is another weight rack holding larger and heavier dumbbells for use by exercisers who can or like to lift significantly more than average. (C) is a stack of mats or other form of padding that can be used by instructor and exercisers (not shown) for use on the floor, during exercise with the machine, during warm up, cool down or stretching periods of the group workout program. (D) is a bin, rack or other means to hold a variety of handle accessories for the instructor to implement during the workout program to add variety to the machine exercise possibilities. (D) could also be a separate holder for dumbbells of particularly smaller size and weight for light weight exercises or for cleaning supplies or any other product or fitness related accessory an instructor may choose to have in his or her exercise area. (E) represents two stacks of two exercise balls, one stack has smaller balls and another has larger ball accessories to accommodate the preference and size of the participants. An instructor can have many more balls than this if they choose. An instructor can have a variety of other products and fitness accessories as well as first aid products in the exercise area to help them augment the machine and free-weight program with the G-Werx gyms. Also products and accessories can be left in an open gap at the bottom of the dumbbell racks if the rack has an open space at the bottom.

As can be seen there is enough room for exercisers to sit on each machine and use them without interference from the sides, front and back. Also as noted in FIGS. 4.1 and 4.2 the machines are opposite one another and can be used in such a way that two opposing machines are combined to make one exercise machine during the workout program.

The number of machines and racks can be greater than what is pictured having many more machines for larger groups of exercisers in an exercise area. Other classroom configurations such as a circle, rectangle a square, rows of machines, etc. can will also work depending upon the facility, number of participants, and number of instructors. These and other classroom configurations can allow for a lane or open area between the opposing machines for an instructor to use while allowing machines to be opposite one another for combined single exercise (as shown in FIG. 4). Additionally, all machines need not face a common direction, which allows instructors and users greater options for setting up a class room for group workout programs.

Figure 8:
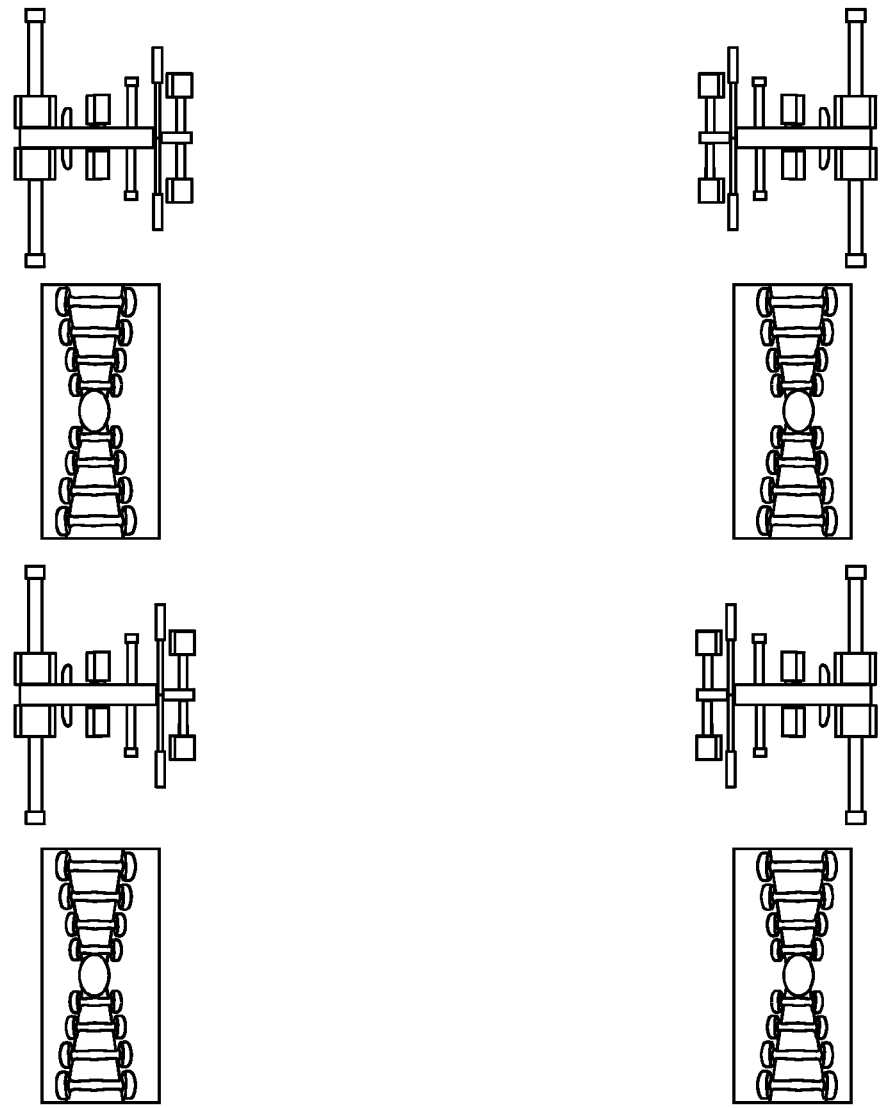
FIG. 8—Top view of four machines with benches folded up or removed to enlarge utilizable square footage between the machines.

FIG. 8 shows atop view of machines with benches folded up to enlarge utilizable square footage of the space for expanded uses and allow exercisers to do exercises unable to perform with bench either down or attached. The machines with benches folded up in FIG. 8 allow exercisers to perform exercises such as those in FIG. 3(B). A participant has access to a wide variety of standing exercises using the lower pulley and cable system and exercises where they are seated on the floor using the lower cable system as well. If the benches are removed completely from the machine exercisers can also do exercises they'd be unable to perform with the bench in folded up (FIG. 3(B)) position. With the bench down or folded up the user can also complete a wide variety of exercises such as those in FIGS. 1(C), 1(B), 3(B) and a wide range of other exercises including numerous seated on the floor and standing style exercises. Some exercises can only be completed when the bench is removed from the machine such as in FIG. 5.1. As shown in FIG. 3 the exercisers could also circuit between a variety of exercises that require the bench to be removed and also with others that require it to be attached. These exercises can also be cycled with any other exercise such as free weight or other exercises completely unrelated to the machine. Utilizing the folding and removable bench technology exercisers can use the open space to lie on the floor on mats to exercise, and can do a wide variety of other types of exercises and movements in the open space created.

When the benches are folded or removed it creates more space between the machines such as compared in FIG. 7 and FIG. 8. Thus a machine such as a G-Werx provides an instructor a unique opportunity to create other forms of exercise in that larger space such as free weight squats, lunges, jumping, jumping rope, using step boxes, doing partner exercises, exercises laying on the floor and others. It can also accommodate stretching and any other form of therapeutic activity or weight lifting exercise. The exercise area could also be used to conduct other forms of unrelated exercise such as cardio boxing, yoga, kettle bells and Pilates when the workout program method is not being conducted. This allows owners of a facility a greater range of options for using the exercise area made to conduct the workout method at hand.

FIG. 8 further demonstrates an embodiment of placing the machines for maximum efficiency of the workout program. The machines are lined up in an opposing and rectangular fashion. The rectangular set up allows one or several exercisers (as shown in FIGS. 4.1 and 4.2) to utilize the machines in combination with one another to form one larger machine for doing exercises. The rectangular set up also allows for space between users, the ability to efficiently place weight holders, and a lane of open space for an instructor (not shown) to move about the program and to have an unobstructed line of site for every person exercising on a machine.

Figure 9:
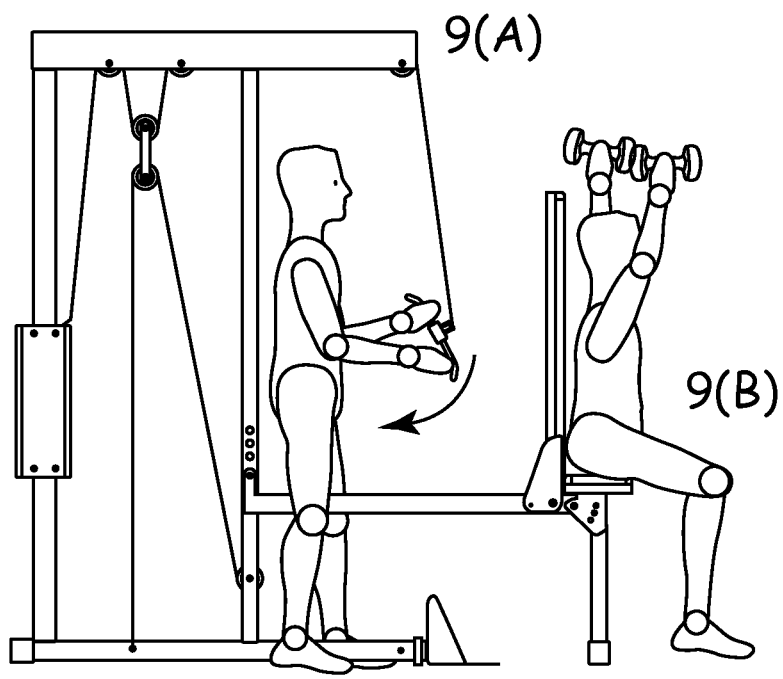
FIG. 9—Two people exercising independently and simultaneously on one machine.

FIG. 9 shows two people exercising independently and simultaneously on one machine.

Here two people in the group workout method are using the G-Werx machine at the same time, each doing a different exercise. The standing exerciser is performing a cable and pulley exercise with dumbbells (not shown) loaded in the carrier for added resistance in position 9(A). The other exerciser is doing a free weight lifting exercise seated on the bench in position 9(B) with the exercisers back supported by the bench back locked in the upright position. More than one exerciser can use the machine at a time in this capacity in the group program method.

Figure 10:
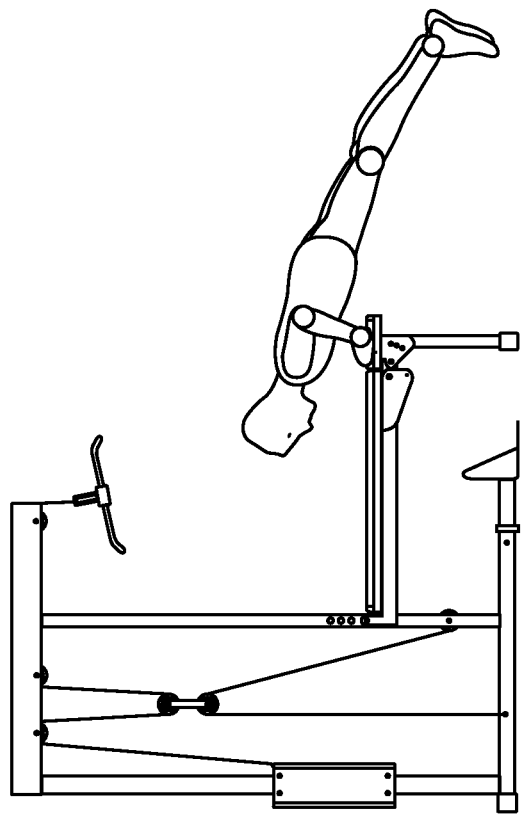
FIG. 10—Two different exercises utilizing machine using no weights or pulley mechanism for body movement exercises on the machine.
Figure 10:
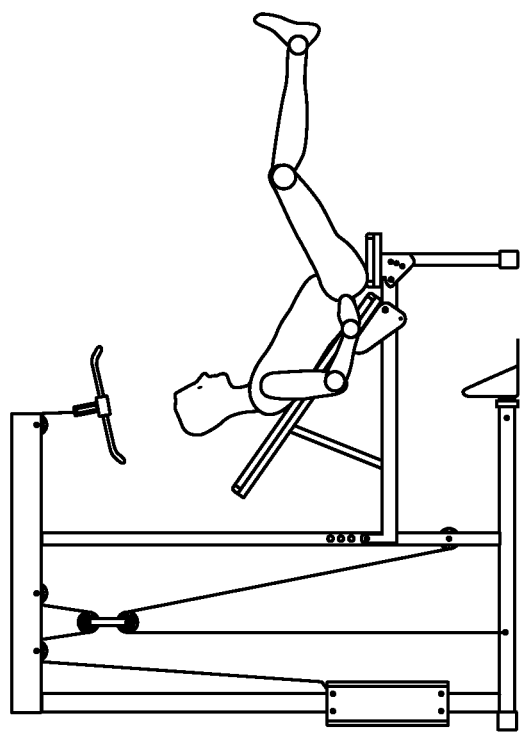

As shown the two exercisers can use one machine simultaneously. Further because this method has machines, dumbbell weights, accessories and other means for the participant to exercise, when there are more participants than machines it is easy for an instructor to create a circuit or other means to have all participants exercising simultaneously either on, off or the machines. This includes having more than one exerciser per machine simultaneously as shown. Further a participant could be doing an exercise on the machine while another uses a rubber tube tied to the machine (not shown) for an exercise and neither will impede the other. FIG. 10 shows two different body movement exercises being performed machine.

In FIG. 10 (A) an exerciser uses the bench on the horizontal position with the bench pad flat to do an elevated pushup body movement exercise. In FIG. 10 (B) an exerciser sits on the bench in the horizontal position with the bench pad inclined and leans back lifting the knees upwards to perform an abdominal lift body movement exercise. The exercise conducted in FIG. 10 (B) could be added to the exercise series in FIG. 1 without requiring conversion of the machine. Further an exercise similar to FIG. 10 (A) could be added where the bench remains flat during the abdominal lift body movement exercise. An exerciser could do the pushup exercise in 10(A) while another exerciser performs a machine cable and pulley exercise at the same time on the same machine such as those illustrated in 1(A) and 2(B).

Figure 11:
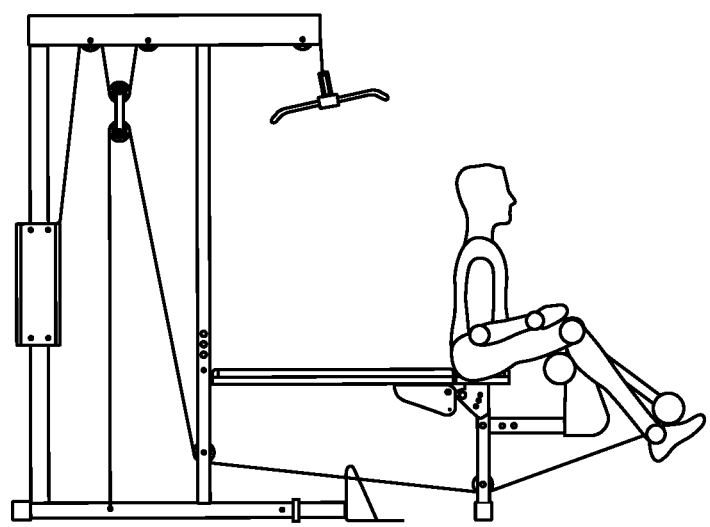
FIG. 11—An exerciser performing a leg extension on a G-Werx machine.

FIG. 11 shows an exerciser performing a leg extension exercise on a G-Werx machine. This exerciser is doing a leg exercise on the G-Werx machine utilizing a removable leg attachment. There should be at least one leg attachment device available in a facility or exercise area that provides this group program method.

Figure 12:
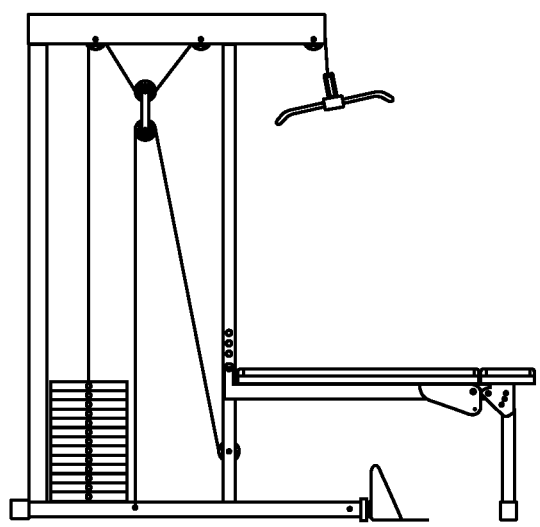
FIG. 12—A machine similar to the G-Werx machine with a stack of weight plates.

FIG. 12 shows a machine similar to the G-Werx machine with a stack of weight plates.

This machine or a similar machine could be used in conjunction with this group training method. It has a stack of weight plates that serve as the resistance for the machine exercises. There is however a drawback of such a machine for use of this exercise program method. This method requires combining free weight exercises with machine exercises and allows for other non-machine exercises as well. When a machine with a weight stack is used it requires more resources per exercise station. Each station or pair of stations must have an available assortment of dumbbells. Therefore using a machine that can utilize the dumbbells for resistance eliminates the need for the extra stack of plates on each machine, wherein a typical weight stack is 150-250 lbs of stacked plates. Further a machine of this nature would be best suited for use in this method if it has a foldable and removable bench.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A group exercise program for machine cable and pulley resistance, free weight machine, non-machine free weight, non-cable body movement machine, fitness accessory, non fitness accessory and cardiovascular training exercises for a plurality of members of a group comprising the steps of:

providing at least two convertible weight lifting exercise machines and hand weights and a hand weight storage apparatus located near the at least two convertible weight lifting exercise machines, wherein the at least two machines each have a vertical frame and a bench selectively attached thereto, each bench adapted to rest on a floor and convertible to an up and out of the way position adjacent the vertical frame, each machine having a single dedicated overhead pulley and cable system to transfer resistance provided by lifting mounted hand weights during pull down machine cable exercises and having a single dedicated lower pulley and cable system to transfer the resistance provided by lifting mounted hand weights during pull up machine exercises;

choreographing both machine exercises that make use of the at least two machines and free weight exercises to be performed by members of the group;

providing instruction or supervision to the plurality of members of the group to perform the machine exercises and free weight exercises, wherein instruction or supervision includes observing individual members to ascertain individual member's fitness needs; and adapting at least one of the machine configuration of at least one of the at least two machines and exercises performed by at least one of the members to differ relative to another of the at least two machines and the exercises performed by other members of the group to individualize the exercise program for the at least one of the members;

wherein adapting includes incrementally changing resistance for at least one of the members to suit their individualized needs; and wherein incrementally changing resistance occurs when exercises are being performed by adding or removing hand weights to the mounted hand weights.

2. The program of claim 1, wherein choreographing includes:

performing machine exercises that make use of at least a one of the at least two machines in an augmented manner including machine cable and pulley resistance exercises utilizing at least one of the at least two vertical frames and at least one of the at least two benches detached from and spaced apart relative to the at least one of the at least two vertical frames as a seat to elevate at least a one of the plurality of members and change an angle of the at least one member's pull while doing a seated exercise as compared to an angle of the at least one member's pull if performed from the floor.

3. The program of claim 1, wherein adapting includes reconfiguring one or more of the at least two machines relative to others of the at least two machines prior to or during the group exercise program.

4. The program of claim 1, wherein instruction or supervision includes suggesting one or more members of the group switch machines to perform either augmented exercises or entirely different exercises from other members of the group.

5. A group exercise program for machine cable and pulley resistance, free weight machine, non-machine free weight, non-cable body movement machine, fitness accessory, non fitness accessory and cardiovascular training exercises for a plurality of members of a group comprising the steps of:

providing at least two convertible weight lifting exercise machines and hand weights and a hand weight storage apparatus located near the at least two convertible weight lifting exercise machines, wherein the at least two machines each have a vertical frame and a bench selectively attached thereto, each bench adapted to rest on a floor and convertible to an up and out of the way position adjacent the vertical frame, each machine having a single dedicated overhead pulley and cable system to transfer resistance provided by lifting mounted hand weights during pull down machine cable exercises and having a single dedicated lower pulley and cable system to transfer the resistance provided by lifting mounted hand weights during pull up machine exercises;

choreographing both machine exercises that make use of the at least two machines and free weight exercises that make use of the hand weights to be performed by members of the group;

providing instruction or supervision to the plurality of members of the group to perform the machine exercises and free weight exercises, wherein instruction or supervision includes observing individual members to ascertain individual member's fitness needs; and wherein based upon the individual member's fitness needs, adapting resistance for machine exercises performed by at least one of the members by incrementally adding or removing the mounted hand weights while the exercise is being performed or while the exercise is paused with tension maintained by the at least one of the members on one of the single dedicated lower pulley and cable system and the single dedicated overhead pulley and cable system.

6. The program of claim 5, wherein the two machines are adapted to accommodate simultaneous exercises using more than one of the two machines.

7. The program of claim 5, wherein instruction includes advice on proper form and technique for exercises and determining and adjusting proper resistance levels and number of repetitions, exercise breathing and encouragement for exercisers.

8. The program of claim 5, wherein choreographing further includes performing identical or different exercises as a series with or without conversion of the machine.

9. The program of claim 5, wherein choreographing further includes several of the plurality of members performing exercises simultaneously as the group.

10. The program of claim 5, wherein choreographing further includes that each of the plurality of members perform multiple exercises on one machine and move to the second machine and perform multiple exercises, wherein at least two of the plurality of members trade positions on the at least two machines, and wherein the plurality of members perform multiple exercises that differ from one another on each of the at least two machines.

11. The program of claim 5, wherein choreographing further includes that each of the plurality of members moves to at least one machine not being used for machine exercises and does a non-machine free weight, fitness accessory or other exercise on the at least one machine.

12. The program of claim 5, wherein said program includes more than a single class and each class varies in exercises, exercise sequences, durations, intensities, resistance progressions, speeds, ranges, muscle groups activated and frequencies.

13. The program in claim 5, wherein supervision includes pre-configuring a plurality of machines each for different machine exercises, and wherein such pre-configured machines have the same, different or mix of handle accessories, and wherein a plurality of exercisers can rotate in a pattern amongst, between and off said machines performing a circuit of said exercises.

14. The program of claim 5, wherein a common area between the at least two exercise machines can be used for non-machine exercises or other activities including fitness activities, meetings, instruction, stretching, balance exercises and other fitness and non-fitness related activities.

15. The program of claim 5, wherein the mounted hand weights can be added and removed from a receptacle which traverses along guide rails of each machine, and wherein said hand weights are added or removed to increase or decrease a cable and pulley exercise resistance.

16. The program of claim 5, wherein each bench is configured to be removed from each vertical frame and be used in an adjacent location from but in combination with at least one of the vertical frames wherein the at least one of the plurality of members sits on the bench for elevation.

17. The program of claim 5, wherein supervision or instruction is offered by a fitness professional.

18. The program of claim 5, wherein the at least two machines can be arranged such that a single exercise can be performed by utilizing the at least two machines simultaneously.

19. The program of claim 5, wherein at least two of the plurality of members perform the same machine cable and pulley resistance exercises in series or simultaneously without conversion of the machine.

20. The program of claim 5, wherein the two machines are adapted to accommodate exercises comprised of machine cable and pulley resistance with pull down resistance, pull up resistance, and free weight machine exercise without changing a configuration of the two machines.

21. The program of claim 5, wherein each bench of the two machines is adapted to be detachable from each vertical frame and is configured to be used in combination with the vertical frame as a free-standing adjacently located accessory to modify or create additional exercise positions and to create an easier transition for the member as compared to a transition by the member from the floor.

22. The program of claim 5, wherein choreographing includes:
  machine exercises that make use of one of the single dedicated overhead pulley and cable system or the single dedicated lower pulley and cable system and hand weights to perform both hand weight and machine cable exercises, the exercises being performed by two or more of the plurality of members on a single one of the at least two machines.

23. The program of claim 5, wherein the program includes changing a handle for an exercise with only one step comprising a connection or disconnection to at least one of the single dedicated overhead pulley and cable system and the single dedicated lower pulley and cable system on the vertical frame.

24. The program of claim 5, wherein while the exercise is being performed comprises either while the hand weights are being raised or lowered by the at least one member.

* * * * *